June 2, 1931.  N. M. BAKER  1,808,448
OPHTHALMIC MOUNTING
Filed May 23, 1930
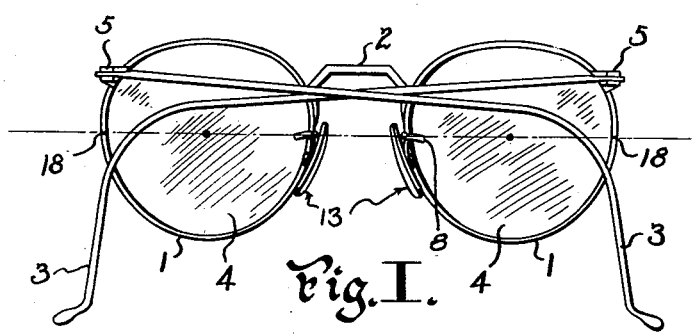
Fig. I.
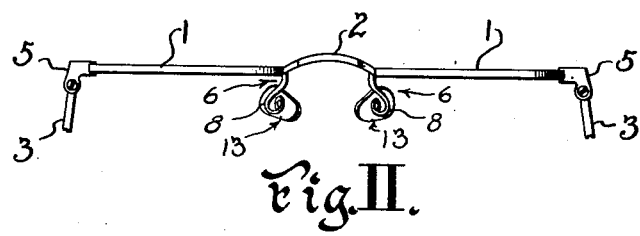
Fig. II.
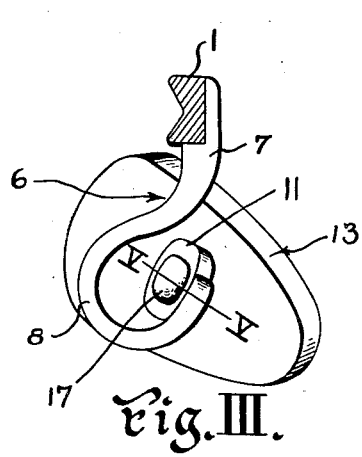
Fig. III.
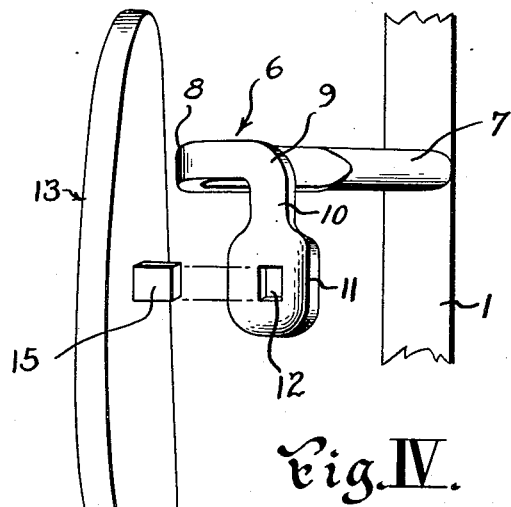
Fig. IV.
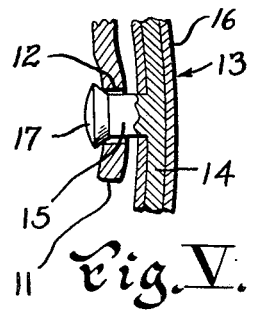
Fig. V.
INVENTOR
Nelson M. Baker.
BY
Harry H. Styll.
ATTORNEY Patented June 2, 1931

1,808,448

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed May 23, 1930. Serial No. 454,994.

This invention relates to improvements in ophthalmic mountings, and has particular reference to improved aligning and nose guard supporting means for the same.

The principal object of this invention is to provide supporting means for a nose guard for an ophthalmic mounting in which that portion of the support adjacent to the lens holding means may be used as a fixation object or an aligning member for aligning the lens supporting means of the mounting by the fitter who is inserting the lenses in the lens holding means, and the opposite portion of which is adapted to support the guard or nose clip member in that position on the nose which has been found from experience to be the one most adaptable to hold the mounting in true, aligned position on the nose and which position is the one that will require a minimum amount of adjustment for adapting the mounting to its true position on the nose and having means intermediate its ends by which the guard may be adjusted up and down, in or out, or in any required angle to adapt it to the individual requirements of the wearer.

Another object of the invention is to provide a support for a self locating or rocking guard which, at one end, provides a fixation point or an aligning member for aligning the lenses and at the opposite end, an attaching point for the guards wherein the guards will be accurately balanced to be self-adjusting to fit individual requirements of the wearer and to support the lenses in a comfortable manner against downward slipping upon the nose.

Another object of the invention is to provide improved means in such a guard support construction wherein the connection to the guard will be removed from the plane of the arm itself so that the parts may be assembled quickly and easily.

Another object is to provide a guard arm support that is relatively resistent to bending or displacement adjacent its connection to the mounting and which is relatively easy of displacement or of adjustment at a point intermediate its ends.

Another object of the invention is to provide means wherein the guards may be more easily adjusted to the individual requirements of the wearer.

Another object of the invention is to provide fixed aligning means wherein the mounting may be trued by the fitter to accurately position the lenses before the eyes of the wearer.

Another object of the invention is to provide guard support means which may be easily grasped for adjustment with the adjusting tools and which will be as inconspicuous as possible when on the face of the wearer.

Other objects and advantages of the invention will become apparent from the following description, taken in connection with the accompanying drawings, and it will be apparent that many changes may be made in the details of construction and arrangement of parts without departing from the spirit of the invention as expressed in the accompanying claims. I, therefore, do not wish to be limited to the exact details shown and described as the preferred form only has been shown by way of illustration.

In the drawings:

Fig. I is a rear view of an ophthalmic mounting embodying the invention.

Fig. II is a fragmentary top plan view of the mounting shown in Fig. I.

Fig. III is an enlarged plan view of the guard and guard arm, showing its connection to the rim.

Fig. IV is a perspective view of the guard and guard arms, showing the parts disunited.

Fig. V is a fragmentary sectional view on line V—V of Fig. III.

The positions of the various parts of an ophthalmic mounting, the shapes of the rims and the shapes and prescriptive characteristics of lenses for ophthalmic mountings are all determined from a datum or aligning line which line is either coincident with or parallel to a plane which contains the lines of straight ahead vision of the two eyes when the mounting is in correct position before the eyes of the wearer.

In the prior art the endpiece connections for the temples for an ophthalmic mounting were positioned in alignment with this datum line to provide fixation or aligning points to guide the fitter in aligning the frame to the requirements of the wearer. Such alignment being of prism importance in those cases where cylinder lenses were employed.

In the present invention, however, the endpieces have been shifted upwardly out of the line of vision of the eyes, hence they can be no longer used as fixation aligning indications so it is one of the important objects of this invention to provide adequate aligning means in a mounting of this type.

Another serious defect in prior art spectacles was that the nose rests or guards were positioned too high upon the nose and caused the edges thereof to cut into the sides of the nose and hurt, or slide down and displace the lenses. This high attachment of guards required an excessive amount of adjustment to fit the individual characteristics of wearers, and oftentimes could not be accomplished.

It, therefore, is the prime object of my invention to provide a guard support which is attached to the lens rims at the desired fixation or aligning point for aligning the frames and also to provide a low positioned, self-locating guard which will require but little adjustment to fit the nose and which, when in adjusted position, will rest upon the angled or wedge shaped portion of the nose and provide a comfortable nose rest which will not slide out of position and displace the lenses and also to provide an intermediate portion by which the guard may be quickly and easily adjusted.

Referring to the drawings wherein similar characters of reference denote corresponding parts throughout the several views, the device embodying the invention comprises a pair of lens rims 1 connected centrally by a bridge member 2 and having on their temple sides the supports or temples 3 for holding the mounting on the face of the wearer. The lens rims 1 are preferably split for the insertion of lenses 4 and joined together at the temple connection by the endpieces 5.

The guards consist in detail of a guard arm or support 6 having a relatively rigid straight portion 7 secured by soldering or other suitable means to the lens rims 1 and extending rearwardly to an adjustable loop portion 8, lying substantially in a horizontal plane, and which extends forwardly to a turn at 9 and downwardly at 10 to an enlarged portion 11. The enlarged portion 11 has a preferably rectangular opening 12 formed therein, as shown in Fig. IV. The portion 7 is substantially round in cross section and is relatively resistent to bending or displacement and the loop portion 8 is substantially rectangular in cross section, having its sides flattened in the direction of the bend, and is relatively easy of displacement or adjustment.

The nose pad 13 is preferably of the non-metallic covered type, consisting of a metallic plate 14 having a rectangular stud 15 secured thereto. The stud 15 is formed slightly smaller than the opening 12 in the enlarged portion 11 of the guard arms 6. A non-metallic covering 16 of celluloid, imitation shell or pearl, or other material, is cemented or otherwise secured to the metallic plate 14, leaving the stud 15 protruding. To secure the pad 13 to the guard arm 6, I insert the rectangular stud 15 in the opening 12 where it loosely fits and form the head 17 to secure it in position. The head 17 is formed so as to leave the stud 15 freely rocking in the opening 12. The pad 13 will not rotate, due to the rectangular shape of the stud 15 and hole 12 but will rock in all directions to adjust itself to the wearer's nose. It is apparent that with this type of guard and guard arm any adjustment may be obtained. To adjust the guard in or out, it is simply necessary to shorten or lengthen the guard arm 6 by bending it at the loop 8. This loop portion also permits the guard to be adjusted up and down or sidewise to any angle desired by adjustment of the head portion 11. By reason of the fact that the rivet connection to the guard is positioned below the loop, the guard can be easily attached thereto without disturbing any of the adjustments. Attention is called to the fact that if desired the rivet member 15 may be rigidly attached to the enlarged portion 11 to provide a rigid, non-rocking guard.

Positioned at the point on the temple side of the rim where the aligning datum line cuts the rims and diametrically opposed to the connections of the guard arms 6 which are also attached to the nasal sides of the rims on this line, there is provided a permanent means by which the fitter can align the frames. This means may be in the form of a notch formed in the rim, such as is shown at the point 18 in Fig. I, or may be in the form of a protuberance on the rim. When the parts of the mounting are assembled in their previously located positions the mounting is then ready to be adjusted by the fitter to conform to the facial characteristics of the individual wearer.

It has been found by fitters and others engaged daily in fitting frames and adjusting guards to the facial characteristics of different wearers, that a straight guard arm having the point of attachment to the pad on the same meridian with the point of attachment to the frame end, is not as comfortable and adaptable to holding the lenses in their proper position before the eyes as one having its point of attachment to the pads considerably lower. It is apparent from the construction of my device that the guards are positioned where they will rest properly upon the nose of the wearer and prevent displacement of the lenses, and that a comfortable nose rest or pad has been provided that requires a minimum of adjustment. From Fig. I it will be seen that the frame may be speedily checked for alignment as aforesaid.

By reason of the fact that the pads 13 are free to rock upon the stud 15 and the point of connection at 12 of the guard arm 6 to the pad 13 is placed in the position acknowledged to be the most comfortable and practical, little adjustment is necessary for individual wearers. There is, however, means provided whereby this minor adjustment may be easily carried out by inserting a pair of pliers or other suitable tools in the open loop 8 and bending the guard arm to conform to the facial characteristics of the wearer.

From the foregoing it will be seen that I have provided simple, efficient, and inexpensive means of carrying out the objects of the invention, particularly in providing a mounting which can be readily checked for alignment and yet have the nose contacting sides positioned where they will bear most comfortably upon the nose of the wearer and require the least amount of adjustment and in which the temples will be removed from the useful field of side vision.

Having described my invention, I claim:

1. In combination with means for holding a pair of lenses before the eyes, an arm portion secured to each lens holding member, substantially at the horizontal meridian thereof, and extending rearwardly to a looped portion in said horizontal meridian and terminating in a downwardly extending end having an opening therein, anchor means in the opening and a nose pad secured by the anchor means to the arm portion, the securing point of said pad and arm portion being in a different plane from the said securing point of the arm portion to the lens holding means.

2. In combination with means for holding a pair of lenses before the eyes, an arm portion projecting from each lens holding member substantially at the horizontal meridian thereof, and extending rearwardly to a looped portion terminating in a downwardly extending end having an opening therein, anchor means loosely mounted in the opening and a nose pad secured by the loosely mounted anchor means to the arm portions for rocking motion thereon, the securing point of the said pad and arm portions being in a different plane from the point where the arm portion intersects the lens holding means.

3. In combination with means for holding a pair of lenses, an arm portion secured to the nasal side of each of the lens holding means and extending rearwardly therefrom to a loop, thence forwardly and thence downwardly, said arm being substantially round in cross section and relatively rigid adjacent its connection to the lens holding means, and being flattened and relatively bendable adjacent the loop and terminal end portions, said loop and flattened portions providing adjustment in and out, up or down or sidewise, and a guard secured to the terminal end portion, the connection of the guard and end portion lying in a plane spaced from the plane of the loop so that the loop portion of the arm will be clear of said connection.

4. In a device of the character described, a pair of lens holding means, bridging means connecting the nasal sides of the lens holding means, guard arms extending rearwardly from the nasal sides of the lens, holding means, said arms intersecting the line of the lens holding means on a line passing through the centers of the pupils of the eyes when the device is in place on the face before the eyes, temples pivoted to the lens holding means on their temporal sides, said temples being connected thereto above the point where the guard arms intersect the lens holding means, and an indication mark on th lens holding means on the temporal sides in the said line passing through the centers of the pupils of the eyes when the mounting is in place on the face.

5. In a device of the character described, means for holding a pair of lenses, means connecting the said lens holding means, an arm portion projecting from each lens holding means on the nasal sides of the lenses at a point substantially on a straight line passing through the centers of the pupils of the eyes when the device is in place before the eyes and extending rearwardly to a looped portion terminating in a downwardly extending connection end, a nose guard, and loosely interengaging parts on said connection end and on said nose guard, said guard being secured by the said loosely interengaging parts to the connection end of the arm for rocking motion thereon, the securing point of said arm and guard being below the securing point where the arm intersects the lens holding means.

NELSON M. BAKER.